June 6, 1939.  W. J. OPOCENSKY  2,161,380
SUBTERRANEAN CAMERA
Filed March 23, 1937   2 Sheets-Sheet 1

INVENTOR.
WILLARD J. OPOCENSKY.
BY
H. A. Duckman
ATTORNEY.

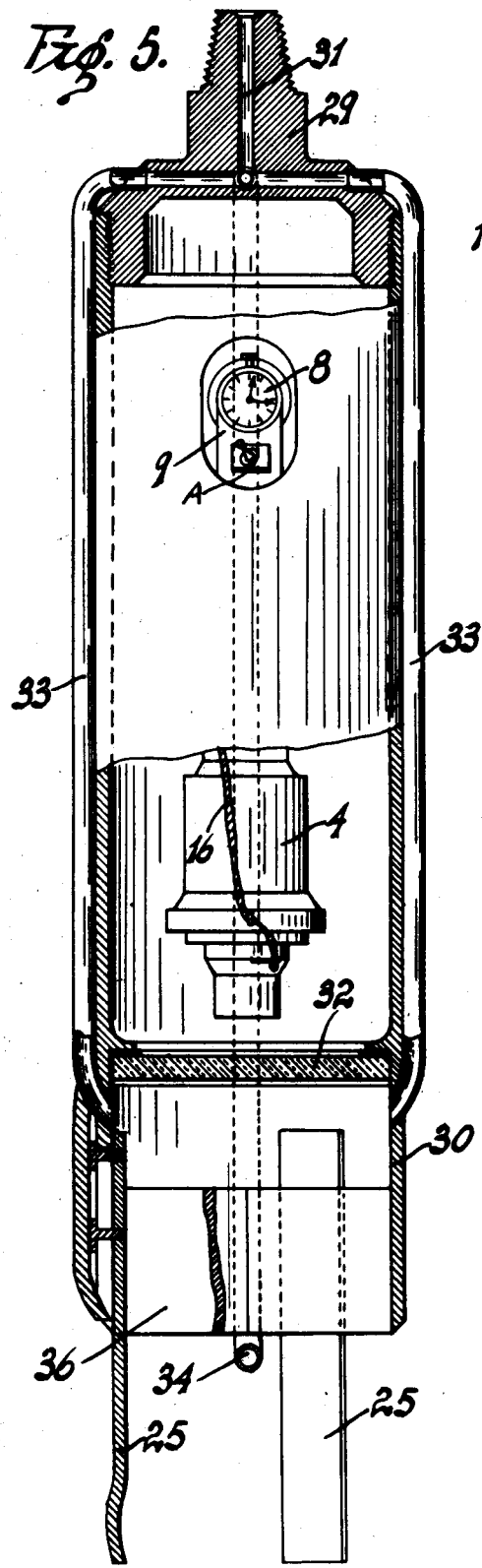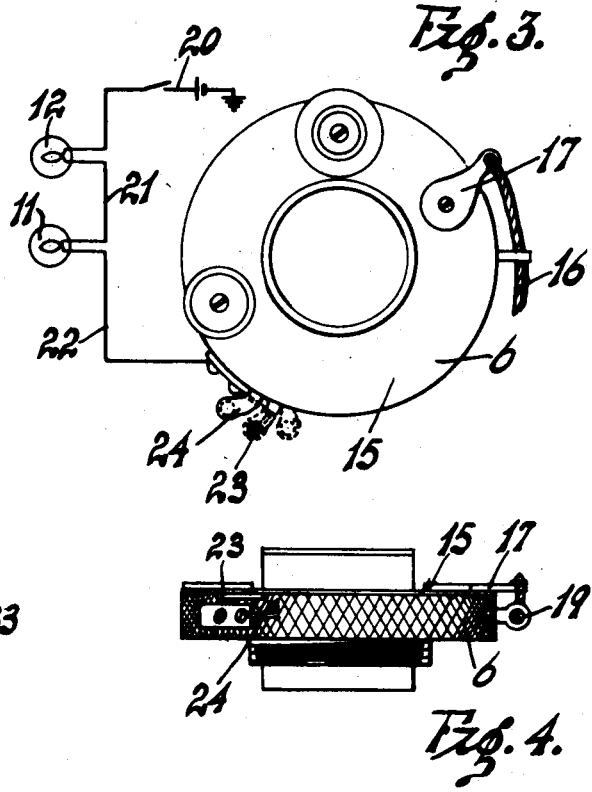

Patented June 6, 1939

2,161,380

UNITED STATES PATENT OFFICE 2,161,380

SUBTERRANEAN CAMERA

Willard J. Opocensky, Long Beach, Calif.

Application March 23, 1937, Serial No. 132,524

10 Claims. (Cl. 95—11)

This invention relates to a subterranean camera by means of which the character of the formation at the bottom of a drilled hole can be determined or the location and position of lost objects or material at the bottom of the drilled hole.

An object of my invention is to provide a novel means of photographing the bottom of a drill hole or objects therein, and particularly to so position the tool relative to the object to be photographed that the said object or bottom of the hole will be in proper focus.

Another object is to provide a novel means of spacing the camera from the object to be photographed so that the object will be in proper focus.

A further object is to provide a novel means of actuating the shutter of the camera for the purpose of taking a photograph.

A feature of my invention resides in the novel positioning and arrangement of the light bulbs so that sufficient light will be provided for the purpose of taking a picture.

Still another object resides in the novel means to circulate water into the drilled hole for the purpose of providing a clear or transparent area through which the photograph is taken.

Other objects, advantages and features of invention may appear from the accompanying drawings, the subjoined detailed description and the appended claims.

In the drawings:

Figure 3 is a plan view of the camera shutter.

Figure 4 is a side elevation of the same.

Figure 5 is a side elevation of a modified form of subterranean camera with parts broken away to show interior construction.

Figure 1:
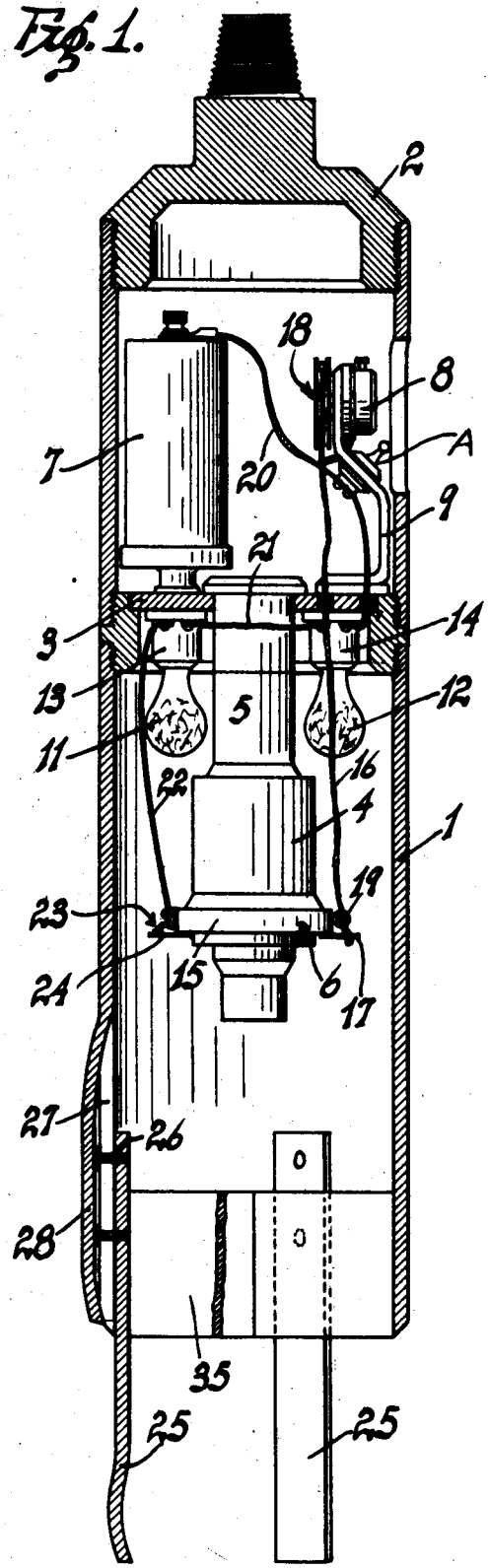
Figure 1 is a longitudinal sectional view of my subterranean camera.
Figure 2:
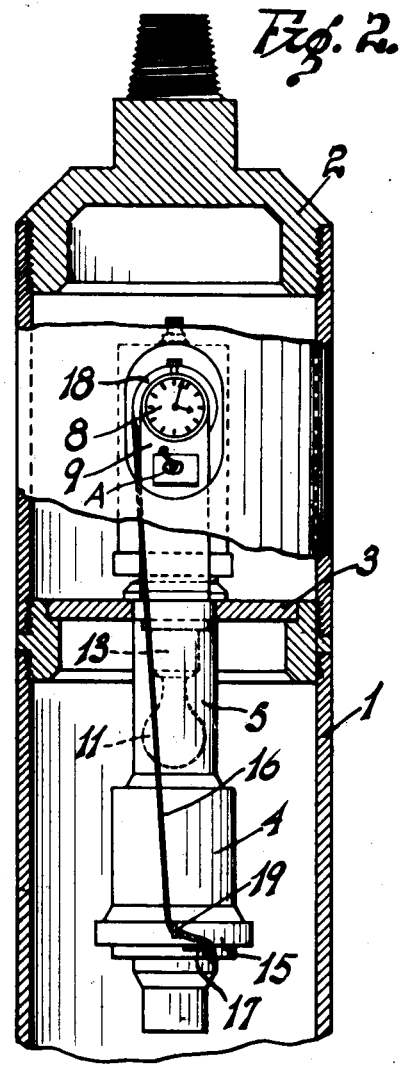
Figure 2 is a fragmentary longitudinal sectional view of the same taken at right angles to Figure 1.

Referring more particularly to the drawings, the numeral 1 indicates a housing preferably tubular in form and the bottom of which is open for the purpose of photographing therethrough, as will be subsequently described.

A sub 2 screws into the upper end of the housing 1 and the drill pipe or cable is attached thereto.

A partition 3 is fixedly mounted within the housing 1 for the purpose of supporting the various elements of the camera, as will be described.

A camera 4 is fixedly attached to a post 5, which post is rigidly attached to the partition 3 and depends therefrom. The camera 4 is preferably positioned in axial alignment with the longitudinal center line of the housing 1. The camera 4 includes a shutter 6, the details of whch will be subsequently described.

A battery 7 is mounted on the partition 3 and extends upwardly from said partition.

A chronometer 8 is secured to a bracket 9, said bracket being fixedly secured on the partition 2. A pair of light bulbs 11—12 are mounted in sockets 13—14 respectively, said sockets being mounted on the bottom of the partition 3. It is to be noted that the light bulbs 11—12 are positioned above the camera 4 and particularly above its lens. The reason for this arrangement being that the film will not be over-exposed or clouded because of an excessive amount of light.

The bulbs 11—12 are preferably of the flash bulb variety. This type of bulb gives a brilliant light for the required length of time to expose the film and the electrical current does not have to be interrupted in order to shut off the light bulbs. The manually operated switch A is provided in the electrical circuit of the bulbs 11, 12, and this switch is closed manually prior to operating the tool in the well. The purpose of the switch is to prevent the electrically circuit from being accidentally closed while the tool is being adjusted on the surface.

The shutter 6 of the camera is of the type which can be so adjusted that the shutter will partially open, then hesitate for an instant and then move into closed position.

The outer ring 15 of the shutter, when tripped, will rotate in a clockwise direction in the manner previously described; that is, the ring will partially rotate then hesitate an instant and then continue its rotation to the closed position of the shutter.

The shutter is preferably tripped from the chronometer 8 through a wire, string, or cable 16, which is attached to the arm 17 and extends upwardly through the partition 3 to a drum 18 mounted on the alarm shaft of the chronometer 8. The cable 16 also extends through a fixed eye 19 so that a pull may be exerted on the arm 17. The movement of the shutter ring 15 previously described actuates a switch for the purpose of lighting the bulbs 11—12. One pole of the battery 7 is grounded and a wire 20 extends from the other pole to one terminal of the bulb 12. A wire 21 connects the bulbs 11 and 12 and a wire 22 extends from the bulb 11 to a switch contact 23. A finger 24 on the shutter ring 15 engages the switch contact 23 as the ring 15 rotates thereby closing the electrical circuit and lighting the bulbs 11—12. The film in the camera 4 is thus exposed and a picture will be taken of the bottom of a hole. The chronometer 8 is set on the surface and this chronometer is provided with the usual trip arrangement, such as an alarm, and since it is known how long it will take to lower the tool to the bottom of the hole, this alarm is set, giving ample time to lower the tool. When the bottom is reached, the chronometer 8 will operate, as previously described, to expose the film.

The arrangement of the switch on the shutter is best illustrated in Figures 3 and 4.

In order that a sharp picture may be taken on the film in the camera, it is desirable to properly space the camera from the bottom of the hole or the object to be photographed. This distance corresponds to the focal length of the camera lens and the spacing is accomplished in the following manner:

A plurality of arms 25 are adjustably mounted on the housing 1. These arms project below the housing and upon striking the bottom of a hole or the object therein, will prevent further descent of the camera. Each of the arms 25 is provided with pins 26 which slidably fit in longitudinal slots 27 in the wall of the housing 1, that is there is one slot provided for each of the arms 25.

When the slots 27 are cut a tongue 28 is allowed to remain and this tongue springs inwardly against the heads of the pins 27 thus holding the arms 25 in their adjusted position.

It is evident from the foregoing description that the arms 25 can be raised or lowered, thus varying the distance from the lower edge of the arms to the camera thereby providing for the necessary adjustments to correspond with the focal length of the camera.

In the device heretofore described an apparatus is provided which will operate in a dry hole or one in which there is clear water or other fluid.

If it is desired to operate the bottom hole camera in a well containing drilling mud or some other light opaque fluid, I may provide the structure shown in Figure 5.

The arrangement of the camera, its mounting, the operation of the camera, the position and mounting of the arms 25, is identical to that described in Figures 1 to 4 inclusive.

The sub 29 at the upper end of the housing 30 is provided with a water course 31 and it is desirable to attach drill pipe to the sub 29. A glass pane 32 is mounted in the housing 30 immediately below the camera 4. The pane 32 is sealed around its periphery so that water or other fluid cannot rise in the housing 30 to damage the camera. A plurality of conduits 33 extend longitudinally of the housing 30 and open inwardly through the wall of the housing below the glass pane 32. The upper ends of the conduits 33 are fitted in the sub 29 and the water course 31 extends to each of the conduits. A plurality of wash conduits 34 are provided on the housing 30 and these last named conduits also received their fluid from the water course 31 and empty the same below the lower edge of the housing 30.

When the camera is run in a hole containing drilling mud, it is necessary to clear the hole below the camera and this is accomplished in the following manner: Clear water is forced downwardly through the drill pipe (not shown). This water then circulates slowly through the conduits 33 and 34. The clear water flows into the area below the glass pane 32 and the mud laden water is pushed upwardly, leaving a clear area through which it is possible to obtain a picture.

In order that an upstanding tool in the hole shall not damage the camera 4 of the glass pane 32, I may provide a spider 35 in the structure shown in Figure 1 or a spider 36 in the structure shown in Figure 5. The spider is mounted in the lower end of the housing 1 or 30 and the material of this spider is sufficiently thin so that the picture taken below the same will not be seriously obstructed.

In operating the subterranean camera, the chronometer 8 is first adjusted so that sufficient time is permitted to lower the tool to the bottom of the hole before the drum 18, on the chronometer will start to rotate. Thereafter, the tool is lowered to the bottom of the hole and with the arms 25 spacing the camera from the bottom of the hole a sufficient distance so that a clear picture can be taken by the camera 4. The device then comes to rest and shortly thereafter, the drum 18 of the chronometer will be rotated, causing a pull to be exerted on the cable 16, which in turn partially rotates the plate 15 of the shutter 6. On rotation of the plate 16, the switch 23 is closed to light the bulbs 11 and 12. The shutter 6 is open at the time these bulbs are lit, and the film in the camera will thus be exposed, taking a picture of the bottom of the hole.

Having described my invention, I claim:

1. A subterranean camera comprising a housing, a camera centrally mounted in said housing, light bulbs mounted in the housing, a battery, said battery being electrically connected to the light bulbs, switch means operatively connected in the battery circuit, an automatic trip means for the switch whereby the switch is closed and the light bulbs are lighted.

2. A subterranean camera comprising a housing, a camera centrally mounted in said housing, light bulbs mounted in the housing, a battery, said battery being electrically connected to the light bulbs, switch means operatively connected in the battery circuit, an automatic trip means for the switch whereby the switch is closed and the light bulbs are lighted, and spacing means depending from the housing.

3. A subterranean camera comprising a housing, a camera centrally mounted in said housing, light bulbs mounted in the housing, a battery, said battery being electrically connected to the light bulbs, switch means operatively connected in the battery circuit, a trip means for the switch whereby the switch is closed and the light bulbs are lighted, spacing means depending from the housing, said spacing means being adjustably secured to said housing.

4. A subterranean camera comprising a housing, a camera in said housing, said housing being open at the bottom, through which a picture is taken, a shutter on the camera, actuating means for said shutter, light bulbs, a battery in the housing, said battery being electrically connected to the light bulbs, a switch in the electrical circuit to the light bulbs, means actuating said switch synchronously with the shutter, a spacing means depending from said housing.

5. A subterranean camera comprising a housing, a camera in said housing, said housing being open at the bottom, through which a picture is taken, a shutter on the camera, actuating means for said shutter, light bulbs, a battery in the housing, said battery being electrically connected to the light bulbs, a switch in the electrical circuit to the light bulbs, means actuating said switch synchronously with the shutter, a spacing means depending from said housing, said spacing means being adjustably mounted on the housing.

6. A subterranean camera comprising a housing, a camera in said housing, said housing being open at the bottom, through which a picture is taken, a shutter on the camera, actuating means for said shutter, light bulbs, a battery in the housing, said battery being electrically connected to the light bulbs, a switch in the electrical circuit to the light bulbs, means actuating said switch synchronously with the shutter, a glass pane in the housing below the camera, said pane being sealed in the housing, a liquid circulating pipe extending longitudinally of the housing, said pipe terminating adjacent the lower end of the housing.

7. A subterranean camera comprising a housing, a camera in said housing, said housing being open at the bottom, through which a picture is taken, a shutter on the camera, actuating means for said shutter, light bulbs, a battery in the housing, said battery being electrically connected to the light bulbs, a switch in the electrical circuit to the light bulbs, means actuating said switch synchronously with the shutter, a glass pane in the housing below the camera, said pane being sealed in the housing, a liquid circuating pipe extending longitudinally of the housing, said pipe terminating adjacent the lower end of the housing, and spacing means depending from the housing.

8. A subterranean camera comprising a housing, a camera in said housing, said housing being open at the bottom, through which a picture is taken, a shutter on the camera, actuating means for said shutter, light bulbs, a battery in the housing, said battery being electrically connected to the light bulbs, a switch in the electrical circuit to the light bulbs, means actuating said switch synchronously with the shutter, a glass pane in the housing below the camera, said pane being sealed in the housing, a liquid circulating pipe extending longitudinally of the housing, said pipe terminating adjacent the lower end of the housing, and spacing means depending from the housing, said spacing means being adjustably mounted on the housing.

9. A subterranean camera comprising a housing, a camera in said housing, said housing being open at the bottom, through which a picture is taken, a shutter on the camera, actuating means for said shutter, light bulbs, a battery in the housing, said battery being electrically connected to the light bulbs, a switch in the electrical circuit to the light bulbs, means actuating said switch synchronously with the shutter, a glass pane in the housing below the camera, said pane being sealed in the housing, a liquid circulating pipe extending longitudinally of the housing, said pipe terminating adjacent the lower end of the housing, and spacing means depending from the housing, and spacing means being adjustably mounted on the housing, a water conduit extending longitudinally of said housing, said housing having a water course extending into the upper end thereof, said conduit being connected to the water course, and said conduit terminating adjacent the lower end of the housing, and a glass pane extending transversely of the housing below the camera.

10. A subterranean camera comprising a housing, a camera in said housing, said housing being open at the bottom, through which a picture is taken, a shutter on the camera, actuating means for said shutter, light bulbs, a battery in the housing, said battery being electrically connected to the light bulbs, a switch in the electrical circuit to the light bulbs, means actuating said switch synchronously with the shutter, a glass pane in the housing below the camera, said pane being sealed in the housing, a liquid circulating pipe extending longitudinally of the housing, said pipe terminating adjacent the lower end of the housing, and spacing means depending from the housing, and spacing means being adjustably mounted on the housing, a water conduit extending longitudinally of said housing, said housing having a water course extending into the upper end thereof, said conduit being connected to the water course, and said conduit terminating adjacent the lower end of the housing, and a glass pane extending transversely of the housing below the camera, a plurality of spacing arms depending from the housing, said spacing arms being adjustably mounted on the housing.

WILLARD J. OPOCENSKY.